US009508032B2

(12) United States Patent
Meng

(10) Patent No.: US 9,508,032 B2
(45) Date of Patent: Nov. 29, 2016

(54) METHOD OF CODING, DECODING AND USAGE OF THREE-DIMENSIONAL CODE

(71) Applicant: Zhiping Meng, Guangzhou (CN)

(72) Inventor: Zhiping Meng, Guangzhou (CN)

( * ) Notice: Subject to any disclaimer, the term of this patent is extended or adjusted under 35 U.S.C. 154(b) by 61 days.

(21) Appl. No.: 13/896,268

(22) Filed: May 16, 2013

(65) Prior Publication Data

US 2013/0306721 A1 Nov. 21, 2013

(30) Foreign Application Priority Data

May 16, 2012 (CN) .......................... 2012 1 0152116

(51) Int. Cl.
*G06K 7/14* (2006.01)
*G06K 19/06* (2006.01)
*G06F 17/30* (2006.01)
*H04B 10/116* (2013.01)
*H04L 1/18* (2006.01)

(52) U.S. Cl.
CPC ......... *G06K 19/06037* (2013.01); *G06F 17/30* (2013.01); *G06K 7/1417* (2013.01); *H04B 10/116* (2013.01); *H04L 1/1861* (2013.01)

(58) Field of Classification Search
CPC ...................... G06K 19/06037; G06K 7/1417; H04L 1/1861; H04B 10/116; G06F 17/30
See application file for complete search history.

(56) References Cited

U.S. PATENT DOCUMENTS

| | | | | |
|---|---|---|---|---|
| 2008/0074560 A1* | 3/2008 | Ichieda | .......................... | 348/739 |
| 2010/0259549 A1* | 10/2010 | Brown et al. | ................. | 345/589 |
| 2012/0098864 A1* | 4/2012 | Chowdhry | ............... | G09G 5/14 345/660 |
| 2012/0181329 A1* | 7/2012 | Gratton | ............. | G06F 17/30879 235/375 |

* cited by examiner

*Primary Examiner* — Sonji Johnson
(74) *Attorney, Agent, or Firm* — Raymond Y. Chan; David and Raymond Patent Firm

(57) ABSTRACT

A three-dimensional code is generated by adding a time dimension in a two-dimensional code so as to form the three-dimensional information structure, so that a three-dimensional code flow with time continuity is generated. The basic unit of the three-dimensional code flow is a two-dimensional code having time information. An encrypted three-dimensional code is able to represent multiple aspects of user behavior including time, place, location, instruction, operation device and etc. Through the three-dimensional code technique, the three-dimensional code content is implanted into a display scene of a client display screen. The user is able to interact with the display device through the three-dimensional code. Through the present invention, a screen without any interactive function can display the interactive media on the screen.

12 Claims, 7 Drawing Sheets

METHOD OF CODING, DECODING AND USAGE OF THREE-DIMENSIONAL CODE

BACKGROUND OF THE PRESENT INVENTION

1. Field of Invention

The present invention relates to three-dimensional code, and more particularly to a method of coding, decoding and usage for three-dimensional code.

2. Description of Related Arts

Currently, there are all kinds of display screen terminals installed in public places such as malls, supermarkets, exhibition halls, railway stations, and etc. These display screens usually display some information regarding enterprises and institutions, social welfare programs, or advertisements of various products.

With the increase of these display screen terminals, media advertisements for enterprises and institutions rely more and more on these display screen terminals. Display screen terminals are embodied as LED screens, LCD screens, plasma screens, or PC displays. These above screens are installed in various living and work environments frequented by people. Many advertisers utilize these display screens as advertisements to display images, videos, web pages, text, and etc. These display screen terminals are also sometimes used to display information regarding social welfare information and work information for the government. For instance, during public events as the World Expo, citizens and visitors learned about the World Expo through display screen terminals in various places, such as subways, malls, and bus stations. Unfortunately, users are only able to passively receive the information sent by these screens because most of these display screen terminals are only capable of displaying information. Only a few terminals are able to sense a user's touch or a mouse click, but these few terminals allow the user to actively pursue interesting information on the screens through the mouse or a touch. The high cost of these touch screens or screens that interact with a mouse is the main factor in the limited widespread usage of these types of display screen terminals, and thus most display screen terminals just have the play function.

In recent years with the development of two-dimensional code technology, two-dimensional codes can begin to be applied to video programs. When the two-dimensional code is added to a video program, it allows the audience to obtain information from the two-dimensional code. For example, the audience is able to obtain the two-dimensional code from the video advertisement, wherein the two-dimensional code contains a URL (Uniform Resource Locator), phone number, and etc. Currently, various applications for the two-dimensional code require photographs to be taken of the two-dimensional code by the user to obtain such information.

Chinese Patent CN200910105475.6 provides a method for acquiring a two-dimensional code from a video or a video device. Through directly acquiring the two-dimensional code by analyzing a video, the user is able to obtain the information embedded in the two-dimensional code from the video. At the same time, acquiring the two-dimensional code is unaffected by external conditions, such as illumination, so that identifying the information in the two-dimensional code is more precise.

Chinese patent CN200510084397.8 discloses a method for controlling visible image transmission rate of a two-dimensional code, which can be used for data transmission between mobile phones, PDAs, tablets PC, or computers. This mainly provides a new method for data transmission through the technology of the two-dimensional code, particularly to improve the correcting mechanism in the transmission process of the two-dimensional codes, so that the data is capable of achieving reliable transmission with external interference.

Chinese patent CN200510110024.3 provides a shopping method and system by using a handset, based on technique of the two-dimensional code. To establish the relationship between the user's mobile phone and bank cards, send order requests to generate a two-dimensional code according to the order requested, and then a generated two-dimensional code is sent to the user's mobile phone. Upon passing certification, the appropriate cash or commodity is then transferred.

In view of the prior art, it is understood that the conventional technologies of the two-dimensional code as a method for acquiring information can be applied to a video and related display content on a video. The technologies of the above inventions are about how to precisely access high quality information in the two-dimensional code but fail to teach any interaction technology which is about the user and the display device or the user and the display content through the two-dimensional code.

In terms of efficiency in transmitting information, it can be said that the most valuable information to the user is the information that the user is most interested to learn. In other words, the information is accepted by the user if the user feels that the information is valuable. It is more efficient to present a user with specific information they want to know rather than displaying a large amount of irrelevant content.

Therefore, it is of great significance and commercial value to invent new techniques for two-dimensional code to interact on terminals screens without an interactive function, so that users are capable of interacting with these terminal screens and are able to take the initiative to learn information displayed by these screens.

The object of the present invention is that it introduces the time dimension to the existing techniques of two-dimensional code to form a three-dimensional code which would allow for synchronous display of the content contained within the three-dimensional code to be played on a display device. This makes the display device with only the ability to play content have the ability of interaction, wherein the user is capable of interacting with the display screen terminals through the three-dimension code to initiate an operation, change the currently displayed content on the screen, or look for interesting information. However, current techniques cannot provide the above function.

SUMMARY OF THE PRESENT INVENTION

The present invention is advantageous in that it provides a method of coding, decoding, and usage for a three-dimensional code that solves the disadvantages of the prior arts, which is the inability for the user to interact with display screen terminal without an interactive function. The user is capable of interacting with these display screens through the three-dimensional code technique provided by the present invention. For example, the user photographs the dynamic flickering three-dimensional code with mobile phone, captures the fragment of the three-dimensional code, and then analyzes the information content in the fragment of the three-dimensional code through an application on the mobile phone. It is worth mentioning that the display content continually changes on the screen terminal. The user continuously photographs the new three-dimension code in accordance with requirement, and the above steps are repeated; and thus the function of interaction between the user and the screen terminal is achieved. The user's mobile phone is analogous with a mouse, and the three-dimension code showed on the screen terminal is analogous with various buttons. Without adding or changing any device or components, a screen terminal with single functionality is changed to have a touch or mouse click function, and interaction between the user and the screen is achieved.

To achieved the above objects, the present invention introduces the time dimension to the existing technique of the two-dimensional code to form a three-dimensional code as an entire solution, wherein such method comprises the steps of:

(A) Adding a time dimension to a two-dimension code to form the structure of a three-dimensional code containing information in the time dimension, and acquire an initial string A1 every time unit;

(B) Adding a time information to the string A1, which generates the string B1, and then encrypting the string B1 using symmetric or asymmetric encryption algorithm;

(C) Coding the encrypted string by using developed coding principles of the two-dimensional code such as Aztec, Maxi Code, QR Code, or Data Matrix, and then generating the encrypted two-dimensional code *C1 or generating the two-dimensional code C1 directly without encryption;

(D) Repeating the above steps (A), (B), and (C) for generating the next two-dimensional code for the next time unit;

(E) Repeating the steps (A), (B), (C), and (D) continually to form a flow of three-dimensional code by continuously generating the two-dimensional code; and (F) Loading the continuously generated flow of three-dimensional code through a local or server based display device to display the flow of three-dimensional code together with other content displayed on the display device.

The continuous three-dimensional code shown on the display device is scanned/photographed utilizing a mobile identifier of two dimensional codes, such as iPhones, Android based mobile phones, Symbian based mobile phones, tablet PCs, handheld PDAs, or other methods of two-dimensional code identification, wherein a fragment of the three-dimensional code is captured, and then each of the two-dimensional codes contained in the fragment of the three-dimensional code is decoded. The fragment of the three-dimensional code consists of one or multiple frames of the two dimensional code.

The captured fragment of the three-dimensional code is decoded through a two-dimensional code decoding/reading software, and through this software the encrypted information content of the fragment of the three-dimensional code can be extracted.

The encrypted information content of the fragment of the three-dimensional code is decrypted and the original information content of the fragment of the three-dimensional code is obtained.

The command information contained in the original information content of the fragment of the three-dimensional code is analyzed, and the display device is activated in accordance with the order information, wherein the interaction between the display device is completed.

As described in the present invention, a three-dimensional code is embodied as a code flow, thus the expressions of a three-dimensional code, a three-dimensional code flow, a code flow of a three-dimensional code will be used interchangeably here after.

As described in the present invention, the display device refers to a terminal, that has the ability to display images, videos, web pages, or texts, such as LED screens, LCD screens, plasma screens, PC displays, and various other display devices.

As described in the present invention, the server refers to the backend server, wherein the server is capable of communicating with the client computer connected to the display device and the mobile identifier of two-dimension codes, and is able to complete the calculations and processing of complex business logic.

As described in the present invention, the mobile identifier of two-dimension codes refers to various devices capable of photographing or scanning two-dimensional codes and run a two-dimensional code identifying program, such as mobile phones, PDAs, tablet PCs, or other mobile devices having this function.

The invention has the following advantages:

(1) The technical solution provided by the present invention of is to add a time dimension on a two-dimensional code, wherein a continuous three-dimensional code flow is generated.

(2) The three-dimensional code flow is capable of being added in the content displayed on various display devices, wherein the displayed content and the three-dimensional code flow are displayed together on the display device.

(3) The user is capable of interacting with the content displayed on the screen terminal with the three-dimensional code through the method of the present invention through a mobile device such as mobile phone.

Many display screens without interactive capabilities can implement the technical solution of the present invention, which allows these display screens to have an interactive function with the users, while no hardware modifications need to be applied to the display screens.

DETAILED DESCRIPTION OF THE PREFERRED EMBODIMENTS

The specific embodiments of the present invention are described hereafter with the accompanying drawings.

Figure 1:
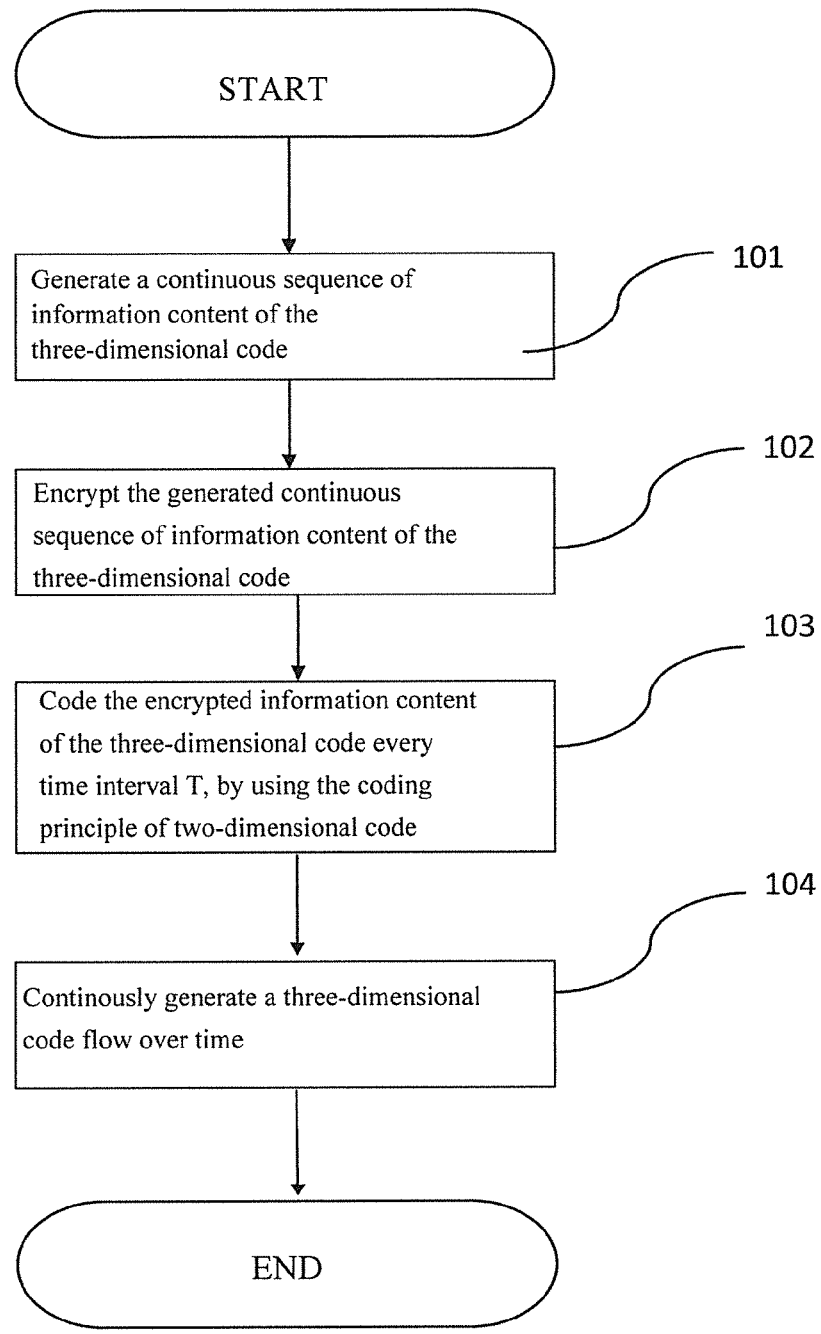
FIG. 1 is a flow chart illustrating a coding method for the three-dimensional code according to the preferred embodiment of the present invention.

Explanation One:

The present embodiment is a coding method for a three-dimensional code. As shown in FIG. 1, the present embodiment comprises the steps of:

101 Generate a continuous sequence of information content of the three-dimensional code.

Every time unit, an initial string A1 is generated. The initial string A1 is a configured constant string, or a variable string. The time information is added to the string A1, and a string B1 is generated (As will be explained later, string B1 is the information content to be contained in the three-dimensional code, or the information content of the three-dimensional code). The time unit refers to a configured time interval T, wherein T represents a constant length of time or a function T(t) depending on the time.

The three-dimensional code of the present invention refers to a time dimension that is added to a two-dimensional code so as to form the structure of a three-dimensional code. The time information and the non-time information are stored in the structure of the three-dimensional code. The non-time information usually refers to the initial string information including, but not limited to, location information, device information, content information, user information, and command information. The time information refers the information corresponding to a time record generated by the system or the device. The time information is a core concept of the three-dimensional code of the present invention. A time information is usually generated through ticks of the system clock. For example, a time information may be represented as 2012:03:27:12:32:54:123; the corresponding time concept is: year:month:day:hour:minute:second:millisecond. Other time representation methods based on this principle are covered by the present invention as well.

102 Encrypt the generated continuous sequence of information content of the three-dimensional code;

In order to prevent the information content of the three-dimensional code from changing during transmission or usage, causing the command information or any other information contained within the three-dimensional code being incorrectly transmitted or implemented, the information content obtained from the continuous three-dimensional code is encrypted by an encryption algorithm according to the present invention. The encryption algorithm is capable of utilizing symmetric or asymmetric encryption techniques. The symmetric encryption techniques include, but are not limited to, DES algorithm, RC2 algorithm, RC4 algorithm, and AES algorithm. The asymmetric encryption techniques include, but are not limited to, RSA algorithm and IDEA algorithm.

103 Code the encrypted information content of the three-dimensional code every time interval T, by using the coding principle of two-dimensional code.

The step is the process for coding the information content of the three-dimensional code. During the coding, the two-dimensional code is generated by a two-dimensional code generation module in accordance with the coding principles of the two-dimensional code. The two-dimensional code generation module refers to a special generation device for the two-dimensional codes or a generation software for the two-dimensional code installed in a mobile device or a PC. The encrypted information of the two-dimensional code is coded in accordance with the principles of Aztec, Maxi Code, QR Code, Data Matrix, and etc. During coding, after the time information is added to the initial string A1 to form the string B1, the string B1 is encrypted to form a string S1, and then the coding for the two-dimensional code is implemented and the encrypted two-dimensional code *C1 is formed. Alternatively, the string B1 can be coded into two-dimensional code without encryption to form a two-dimensional code C1.

The above steps 101, 102, and 103 are repeated in the next time unit and the next two-dimensional code is generated. The two-dimensional codes are continuously generated forming a continuous flow of the three-dimensional codes. The code flow of the three-dimensional code is a continuous image sequence of the two-dimensional codes formed under a constant or variable time interval T. If a fragment of the three-dimensional code is captured, then the fragment of the three-dimensional code may be a frame of the two-dimensional code or multiple frames of the two-dimensional code.

However, the three-dimensional code is substantially different from the two-dimensional code generated by the coding technique for a two-dimensional code. The differences are the following: (1) In the coding method, static two-dimensional code image is generated by the existing method for a two-dimensional code, and then the image information is generated, but the image information has no relation with time. In the present invention, after the coding method, a two-dimensional code image containing time information is generated. (2) In the displaying method, after the existing two-dimensional code is generated, the existing two-dimensional code is no longer changed when displayed. But the three-dimensional code of the present invention dynamically changes when displayed as the time changes. In other words, in every time interval, a two-dimensional code with time information is generated. The three-dimensional code of the present invention is a continuous coding process; a sequence of the two-dimensional code is continuously generated according to the time. The displaying method of the three-dimensional code is characterized by the two-dimensional code continuously changing with the time unit. The time unit can be a millisecond, a second, a minute, or some larger or smaller unit of time. If a three-dimensional code is shown on a certain area of a large screen, and the time unit of the three-dimensional code generation is millisecond, then the area may look to be flickering or quickly changing. The area can be captured by a mobile phone, and a unique and clear two-dimensional code corresponding with the captured time is obtained. The two-dimensional code is then decoded, decrypted and analyzed, and the command information contained in the information content of the three-dimensional code fragment is executed, and the interaction is completed.

104 Continuously generate the three-dimensional code flow over time. The three-dimensional code flow is displayed by utilizing similar methods of compression coding for images or videos. The method of compression coding includes, but is not limited to, entropy coding, predictive coding, transform coding, and hybrid coding. The three-dimensional code flow is transmitted directly and is encapsulated into one of the following formats: AVI, RMVB, MKV, ASF, WMV, MP4, 3GP, or FLV. The basic unit of a three-dimensional code is a two-dimensional code containing time information. The generating process of the three-dimensional code depends on the time, and the three-dimensional code is coded with time information, thus the double inclusion of time increases the reliability of coding.

For the coding process of the present invention, the time interval T is the time unit for the coding method, and coding is implemented every time interval T. The time interval is constant or dynamic, but in regards to the coding time, the process is continuous, wherein the three-dimensional code is a continuously generated code flow; this code flow is formed by displaying a sequence of identical or different two-dimensional codes successively according to a constant or variable time interval T. The display screen terminal includes, but is not limited to, a TV, a PC display screen, or a phone screen.

Explanation Two

Figure 2:
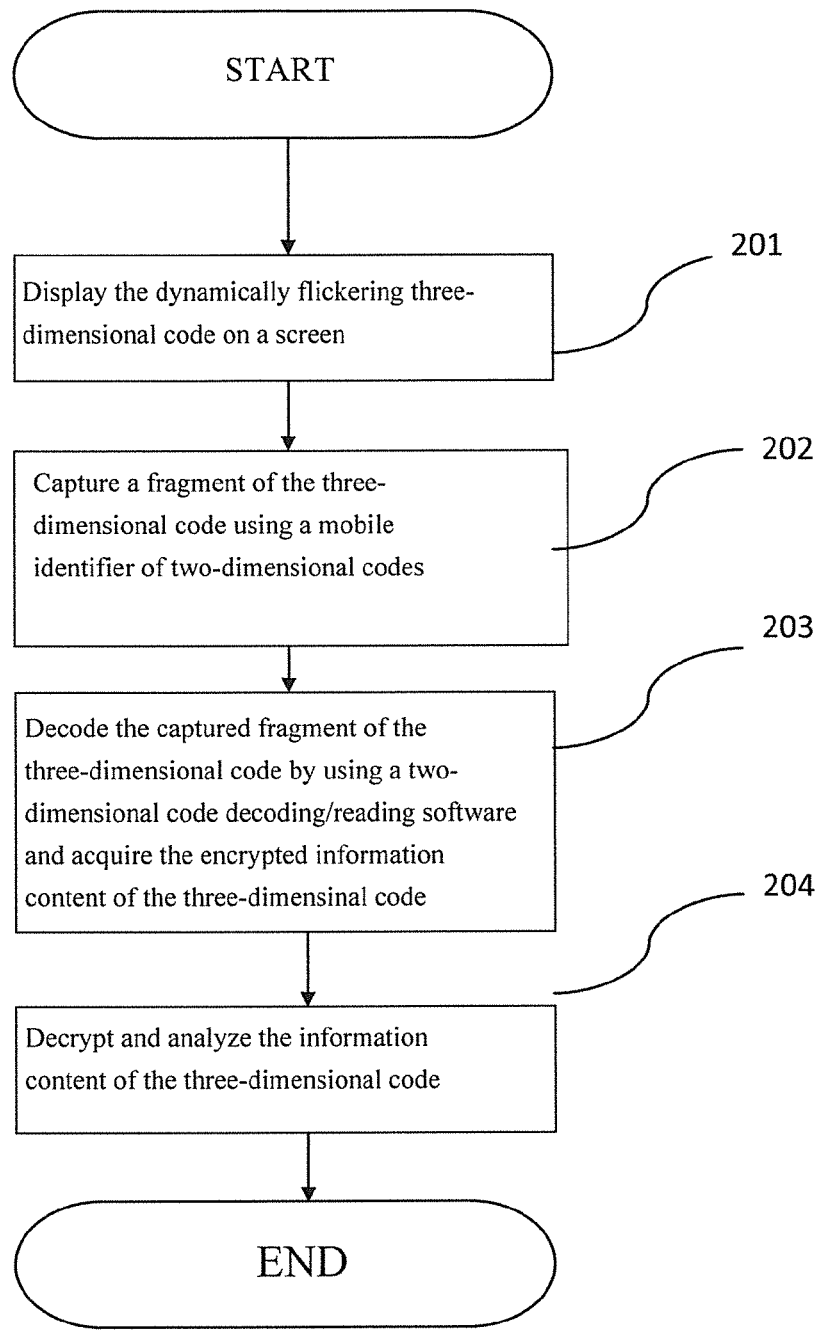
FIG. 2 is a flow chart illustrating a decoding method for the three-dimensional code according to the preferred embodiment of the present invention.

The present embodiment is a decoding method of the three-dimensional code. As shown on FIG. 2, the present embodiment comprises the steps of:

Using a mobile device such as a smart phone, the continuous three-dimensional code is captured to obtain a fragment of the three-dimensional code consisting of one or multiple frames of two-dimensional code, and then each frame of the two-dimensional code of the three-dimensional code fragment is decoded.

The three-dimensional code comprises a plurality of frames of two-dimensional code. The information content coded with each frame in the three-dimensional code includes, but is not limited to, one or multiple items of the following: time information, location information, device information, content information, or the command information.

201 Display the dynamically flickering three-dimensional code on a screen.

During the implementation process, the three-dimensional code generated by coding of the present invention is added through the client computer connected to the display screen or the server connected to the display screen, wherein the three-dimensional code is shown together with any other content on the display screen. Since the three-dimensional code generated by coding of the present invention is a two-dimensional image that changes with time, the two-dimensional image will flicker dynamically when it is displayed on display screen.

202 Capture a fragment of the three-dimensional code using a mobile identifier of two-dimensional codes.

The process of capturing the fragment of the three-dimensional code comprises the following: scanning/photographing the dynamically flickering three-dimensional code using a mobile identifier of two-dimensional codes when it is shown on the screen, wherein a fragment of the three-dimensional code is captured in that specific moment. The basic unit of the three-dimensional code is the two-dimensional code containing time information, while the fragment of the three-dimensional code comprises one frame or multiple frames of the two-dimensional code containing time information. The mobile identifier of two-dimensional codes refers to a mobile device capable of identifying two-dimensional codes, which including, but not limited to, Apple iPhones, Android mobile phones, Symbian mobile phones, tablet PCs, handheld PDAs, or any other two-dimensional code identifiers.

203 Decode the captured fragment of the three-dimensional code using a two-dimensional code decoding/reading software, and acquire the encrypted information content of the three-dimensional code.

According to step 202, the captured fragment of the three-dimensional code by the mobile identifier of two-dimensional codes consists of one or multiple frames of two-dimensional code, therefore, the one or multiple frames of two-dimensional code is/are capable of being decoded through a two-dimensional code decoding/reading software. Because of the encryption technique utilized during the generation process of the three-dimensional code of the present invention, the fragment of the three-dimensional code is decoded into encrypted information. In other words, what acquired from the above decoding process is the encrypted information content of the three-dimensional code.

204 Decrypt and analyze the information content of the three-dimensional code.

In this step, the encrypted information content of the three-dimensional code is decrypted, and the original information content of the three-dimensional code is obtained and then analyzed.

Explanation Three

Figure 3:
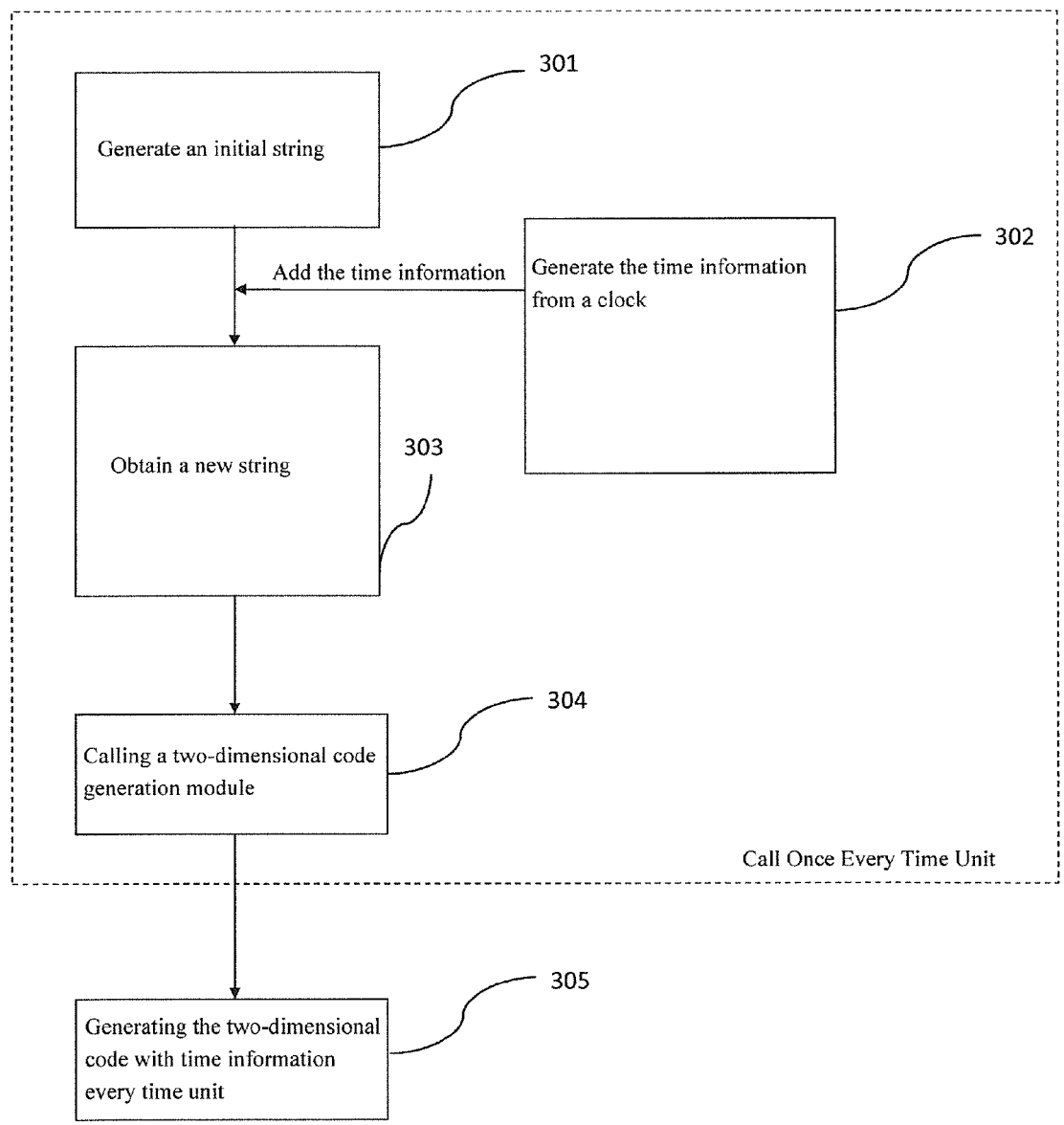
FIG. 3 is a flow chart illustrating a generation method for the three-dimensional code according to the preferred embodiment of the present invention.

The present embodiment is a method of continuously generating the three-dimensional code. As shown on FIG. 3, the present embodiment comprises the steps of:

301 Generate an initial string through structurally describing non-time information acquired in real-time.

As described in this step, the non-time information includes, but is not limited to one or more items of the following, the location information, the device information, the content information, the user information, and the command information.

The location information, described as a location ID, is the position information of the device capable of displaying the information of the three-dimensional code.

The device information, described through device ID, refers to a hardware device in a specific position.

The content information, described as a content ID, is utilized for identifying the content wherein the three-dimensional code is implanted or displayed with, which is displayed on a device capable of displaying the three-dimensional code.

The user information refers to a directly or indirectly obtained ID containing the identity information of a user. When directly obtained, the user information is directly entered by the user or imported from a database. When indirectly obtained, the user information is acquired from the server.

The command information refers to one or multiple instruction sequences carried by the three-dimensional code. After decrypted, the instruction sequence is transmitted to the server or the backend content server to implement the operation and control of the display screen or some other devices.

302 Generate the time information from a clock.

In this step, the corresponding time information is generated through the clock every time interval T. The time information is a time record or a function of a time record generated every time unit. For example, a time record may be represented as 2012:03:27:12:32:54:123; wherein the corresponding time concept is: year:month:day:hour:minute:second:millisecond. The time interval of generating the time information is usually the same as the time interval of coding of the two-dimensional code, wherein generation of every unit of the three-dimensional code corresponds with the generation of a time information. For example, if a time information is generated every second, then sixty units of a three-dimensional code are generated in one minute. (To be more specific, a unit of a three-dimensional code is a two-dimensional code with time information)

303 The corresponding time information generated by the step 302 is added to an initial string, and a dynamic new string is generated every time interval T.

This process is a main feature of the present invention, wherein the information structure of the initial string is changed through adding the time information. The time information is added in the initial string to form a new string structure with the time information. The frequency of new string generation with the time information is consistent with the frequency the time information is generated. Therefore, the generation process of each new string is at a constant time interval T or a variable time interval T. In operation, T can be set as a constant time interval such as one second, or a sequence of variable time intervals such as the sequence of one second, two seconds, one second, three seconds . . . . The generated new strings constitute the information content of the three-dimensional code.

304 Calling a two-dimensional code generation module.

This is a coding process completed by calling the two-dimensional code generation module every constant or variable time interval T. Since the three-dimensional code of the present invention is essentially a sequence of two-dimensional codes continually generated over time, thus at a specific moment, the three-dimensional code can be regarded as a two-dimensional code. Therefore, the new strings with the time information added can be coded with the existing two-dimensional code generation module.

305 Generating the two-dimensional code with time information every time unit.

This process is to code the corresponding dynamic new string generated in step 303 using the two-dimensional code generation module, producing a two-dimensional code with time information every time interval T. According to the chronological order of the generation time of each of the two-dimensional codes, these two-dimensional codes with time information are displayed successively, wherein a continuous three-dimensional code flow is generated.

Figure 4:
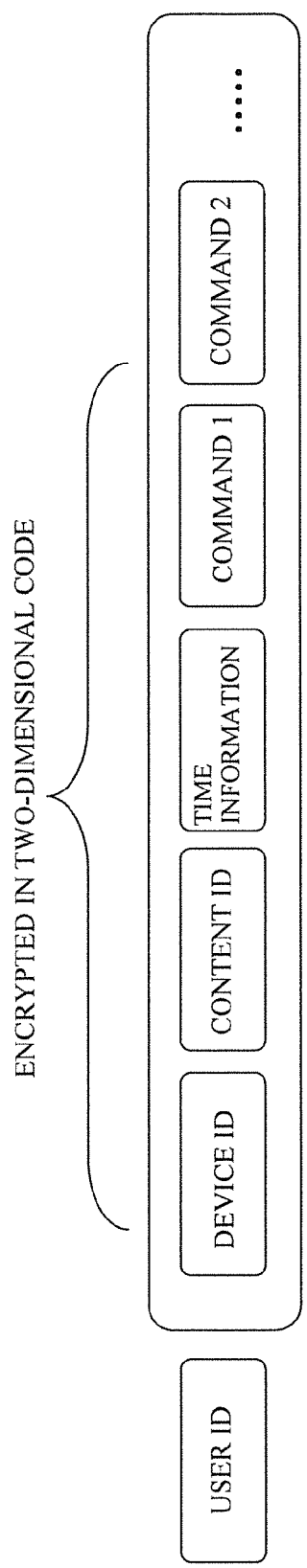
FIG. 4 is a block diagram illustrating the structure of a three-dimensional code according to the preferred embodiment of the present invention.

FIG. 4 illustrates the information structure of the three-dimensional code according to the present invention. The information structure mainly comprises the device ID, the content ID, the time information, and the command. The information structure must comprise at least the time information.

As shown in FIG. 4, the information structure of the three-dimensional code is represented as a set of items, which must contain the time information; the location ID, device ID, content ID, user ID, and command information may be contained as well. The user ID can be obtained from one of the following two methods: To add the user name and relevant information when the user logs in, and then store the above information in the two-dimensional code; To acquire the user information if the user utilizes a smart mobile device, and transmit the acquired information to the server.

In the information structure of the three-dimensional code, the user ID information is capable of uniquely marking a user's identity and being acquired. This user ID information can be the user's login name, email address, phone number, IMEI number, Device ID number (Device number), and MAC address. For iPhone devices, if it is difficult to acquire the phone number or IMEI number then a Device ID can be obtained.

The command is encrypted and stored in the structure of the three-dimensional code, which can be in the forms of a URL address, an XML, or another encapsulated format. Since every QR code or Datamatrix barcode have a storage capacity of approximately 2000 bites (2k), a plurality of commands can be stored in each unit of the three-dimensional code, utilizing the format of command 1, command 2, etc. (It is also possible that only one piece of command information is stored in each unit of the three-dimensional code).

During encryption, the information content is mainly encrypted utilizing a symmetric or an asymmetric encryption algorithm, and this information content contains the time information, the device ID or the location ID, the content ID, the command, etc., and every time interval T, a two-dimensional code with the encrypted information is generated, forming a continuous two dimensional-code sequence changing dynamically over time, which is a three-dimensional code.

Figure 5:
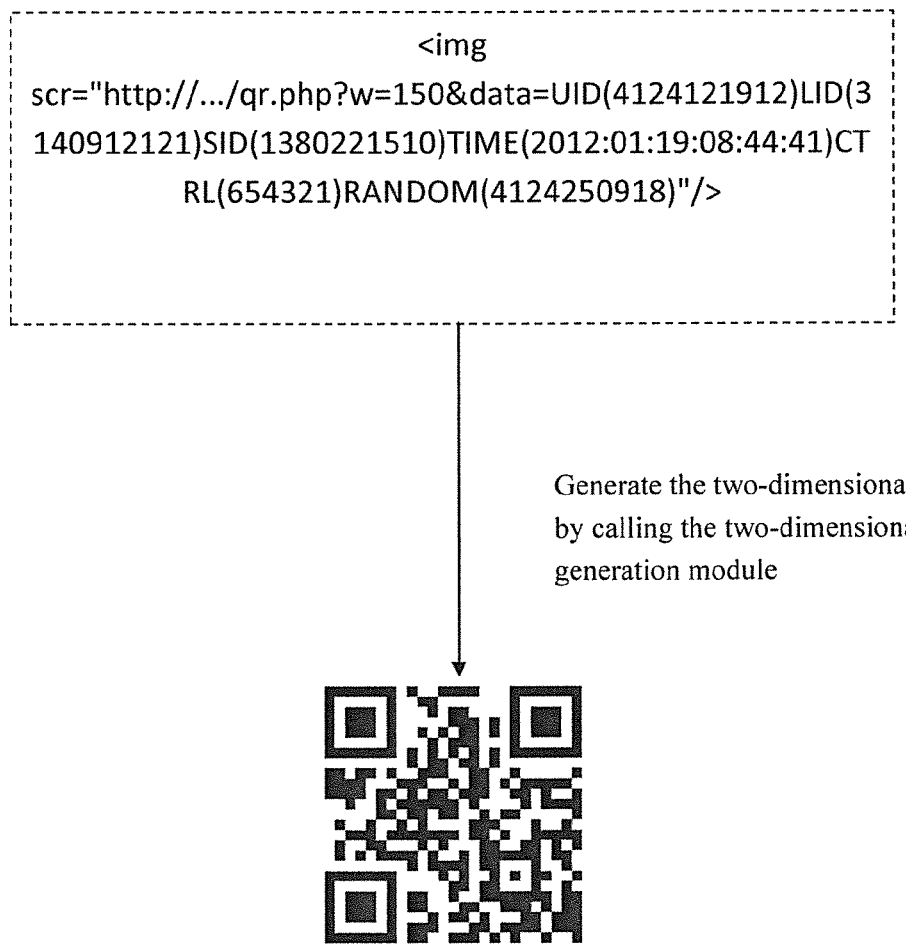
FIG. 5 is a code diagram illustrating calling the generator for two-dimensional code according to the preferred embodiment of the present invention.

In the specific encryption format as shown in FIG. 5, the encryption process is capable of being embedded into a webpage. For example, a piece of code can be written as: <img src=http://...../qr.php?w=150&data=UID (4124121012)LID(3140912121)SID(1380221510)TIME (2012:01:19:08:44:41)CTRL(654321)RANDOM (4124250918)/>. When the above code is implemented, the two-dimensional code generation module is called, then the information contained in the above code is encoded through the principle of the two-dimensional code, and an image of the two-dimensional code is generated. In this embodiment, the content is encapsulated in each of individual two-dimensional codes by utilizing the URL format. The information contained in the figure is an unencrypted URL with a width of 150 pixels.

In the above code, UID represents the user identity information. LID represents the current location information acquired through GPS or other location services. SID represents the service or content information ID. Each of the above IDs corresponds with an analytic ID index table. If the user captures a two-dimensional code containing the above ID information and sends the analyzed information content to the server, the server is able to obtain the meaning of the information through the analytic ID index table. Additionally, TIME is the time information, which comes in many formats, for example, a piece of time information can be in the format of "year:month:day:hour:minute:second:millisecond". If the display content is temporary, then the format of the time information can also be "hour:minute:second:millisecond". The adoption of a specific format of the time information depends on the different application requirements, but each of the formats belongs to the core idea of the three-dimensional code of the present invention. RANDOM represents a random number to distinguish a random user, a random service; it is also possible to be related to the encryption process.

After the processes of FIG. 4 and FIG. 5, the three-dimensional code of the present invention is capable of describe the key elements of a behavior, i.e. "who" at "what time" in "what location" doing "what" to "what object". The information of the three-dimensional code contains behavioral elements. The behavioral elements comprise one or multiple items of the following: the user information, the time information, the location information, the device information, the content information and the command information. These behavioral elements of the three-dimensional code represent one or more users at the corresponding time, in the corresponding location implementing the corresponding act to complete the corresponding function. This behavior characterization of the three-dimensional code structure brings tremendous amount of applications.

For example, the three-dimensional code of the present invention can be used in the user identification process of an entrance guard system. When using the entrance guard system, the authorized user identity information is registered in advance in the form of a user ID. The user ID may be in the forms of a user identity number, a phone number, an email address, etc. Then the lock ID is identified, wherein the lock ID means the device ID, and the device ID may be the factory serial number of the lock or an existing physical location, and then the content ID shown on the screen is identified. A piece of time information TIME is generated every time interval T through the system time generator, and the command that is to be carried by the three-dimensional code is determined, which is the CTRL command. In this embodiment, the command carried by CTRL may be opening or closing a lock. After the above three-dimensional information is acquired, the above information is encrypted through an encryption algorithm, and then a two-dimensional code generation module is called repeatedly and a three-dimensional code is generated.

The user captures a fragment of the three-dimensional code displayed on a display device of the gate by using an application on a smart phone. A two-dimensional code with the time information is acquired after the capture. The two-dimensional code with the time information is decoded through the application on the smart phone, and the decoded information is sent to the backend server. The sever then analyzes and the command information contained within the decoded information if the information sent from user is received in a valid response time, after which the related operation is finished and the gate is unlocked. If the information isn't sent to the background sever in a valid response time after the user has captured the three-dimensional code fragment, then the unlock process fails.

Explanation Four

601 is a user, and it is assumed that the user has an identifier of two-dimensional codes, wherein the identifier can be a smart phone, a tablet PC, a handheld PDA, or any other special two-dimensional code capturing/identification device. The user is capable of capturing and decoding the continuous three-dimensional code flow, showed on the interactive display screen 602.

602 is a display screen without built-in interactive functions (e.g. responding to mouse clicks or user touches). The advertiser or owner may play or display the corresponding content through the display screen 602. The content played/displayed can be an image, a video, a web page, some texts, etc. Currently, a user can only passively watch the content on the screen. Due to the high cost of implementing a touch function feature, very few screens support user touches, and this creates a lack in interaction between the user and the screen.

The interaction between the user and the display screen is implemented through the continuous three-dimensional code flow added to the display screen according to the present embodiment of the present invention. For example, a 30 minute film is displayed on the screen. The information content of the three-dimensional code corresponding to the film is encapsulated before the film is displayed. The main encapsulated information is the time information 604, the location ID information 605, the content ID information 606, the command information 607, and the user ID information 603. The user ID information 603 may or may not be encapsulated. The generation time interval T of the time information needs to be confirmed before the time information 604 is encapsulated. In this embodiment, the time information is generated every second, and therefore an image of the two-dimensional code with the time information is generated every second. For a 30 minutes film a continuous sequence of 1800 two-dimensional codes will be generated. This continuous sequence of 1800 two-dimensional codes are integrated and displayed successively to form a continuous three-dimensional code flow, and then the continuous three-dimensional code flow and the content of the film are displayed together on the display screen.

Figure 6:
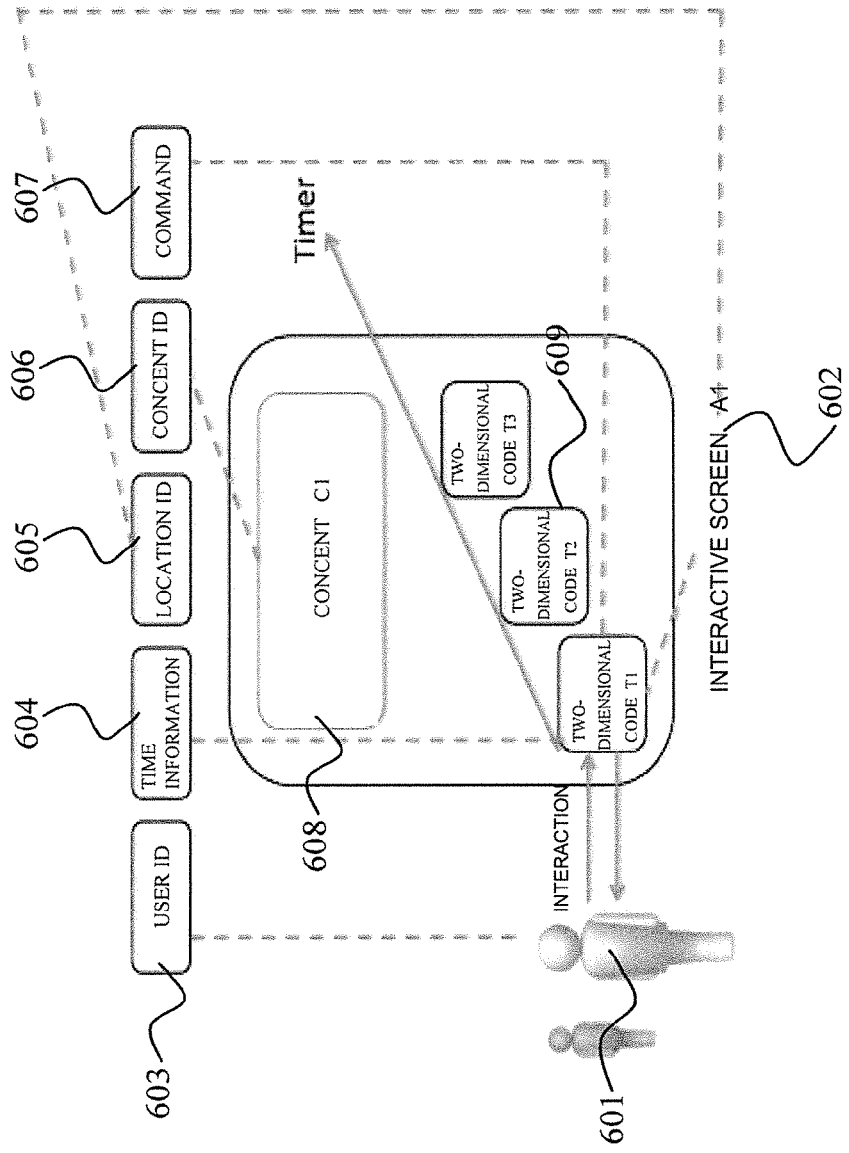
FIG. 6 is a block diagram illustrating a user interacting with a screen terminal according to the preferred embodiment of the present invention.

Content 608, which is played on the display screen, corresponds to content ID 606. Two-dimensional code 609 is the two-dimensional code with the time information being generated every time interval T. As shown on FIG. 6, the two-dimensional code sequence generated by the present invention and the film to be displayed have an equal display time, and thus they can be integrated together for displaying. When displayed, an image of the two-dimensional code is updated every second, so in the image display area, the generated three-dimension code has a dynamic flickering effect. The flickering effect draws the user's attention and reminds the user to photograph/scan the two-dimensional code, thereby facilitating the process of user interaction with the content played on the screen.

The user information isn't implanted into the three-dimensional code directly. The user interacts through a smart mobile device, and the user information is acquired and sent to the server through an application or program implanted into the smart mobile device.

The user information includes, but is not limited to one or multiple items of the following, the mobile phone number, the MAC address, the IP address, the device number, and the user ID.

Before implementation, an application is installed on a mobile phone, a handheld mobile device, or a device used specifically for capturing/identifying the two-dimensional code. The application is used for identifying/reading the two-dimensional code, and at same time the handheld mobile device has a camera able to take photographs. When the user watches the terminal screen playing the content containing the dynamically flickering two-dimensional code image (which is the three-dimensional code of the present invention, and the three-dimensional code of the present invention is a continuous code flow), the two-dimensional code is acquired through the handheld mobile device, and the capturing time of the two-dimensional code is recoded. After the two-dimensional code is captured, the handheld mobile device automatically analyzes it, and the analyzed information from the two-dimensional code is sent to the server control terminal through wireless or wired transmission. Then the received command information is sent to the client computer connected to the display screen 602 through the server, and after receiving the command, the client computer connected to the display screen 602 updates the played or displayed content. (The above two-dimensional code may also be sent to the server directly without analyzing in the handheld mobile device, while the code analyzing process is completed in the server.) After the played or displayed content is updated on the display screen 602, the updated content will also contain one or multiple three-dimensional codes, therefore the user may further capture the three-dimensional code through the handheld mobile device. The above process is repeated to implement user interaction and control with the screen. The command carried in the information structure of the above three-dimensional code may be represented as a URL address, a control command, a XML command, or any other contents that may be understood by the application of the handheld mobile device or the server control terminal.

For example, assume that the screen is playing scene 1, a scene of a large talent show, and in the bottom right corner of the screen there is a display area for displaying the flickering two-dimensional codes (the three-dimensional code). The user photographs the three-dimensional codes when the user sees it. The moment the photograph is taken, the content displayed on the screen changes to scene 2. Scene 2 is another scene of the talent show, giving the user further choices such as to watch the men's group or the girl's group, or to participate in a lottery. The user can choose to watch the show of a particular group by photographing the three-dimensional code related to that group. After entering the scene of the chosen group, the user may further vote for one of the candidates by entering the candidate number in the handheld mobile device. If the user is interested in participating in the lottery, the user can take a photo of the three-dimension code related to the lottery section using the handheld mobile device, and then a scene of participating in the lottery is displayed on screen. During this interaction, the three-dimensional code that appears on the screen is equivalent to a command button, and the user taking a photo of the three-dimensional codes is equivalent to touching or clicking the button to trigger the button event, so that the content of the screen will respond to the button event. Without the present invention the above interaction would be impossible for a display screen without built-in interactive functions (e.g. responding to user touches or mouse clicks).

Currently, most display screens cannot directly interact with the mobile devices; therefore, the present invention bridges this communication gap by using an application in the mobile device and the backend server. Various types of screens are connected with the backend server through a wireless or wired connection so that if the displayed content on the screen needs to be changed, the server is informed and a command is sent by the sever.

Figure 7:
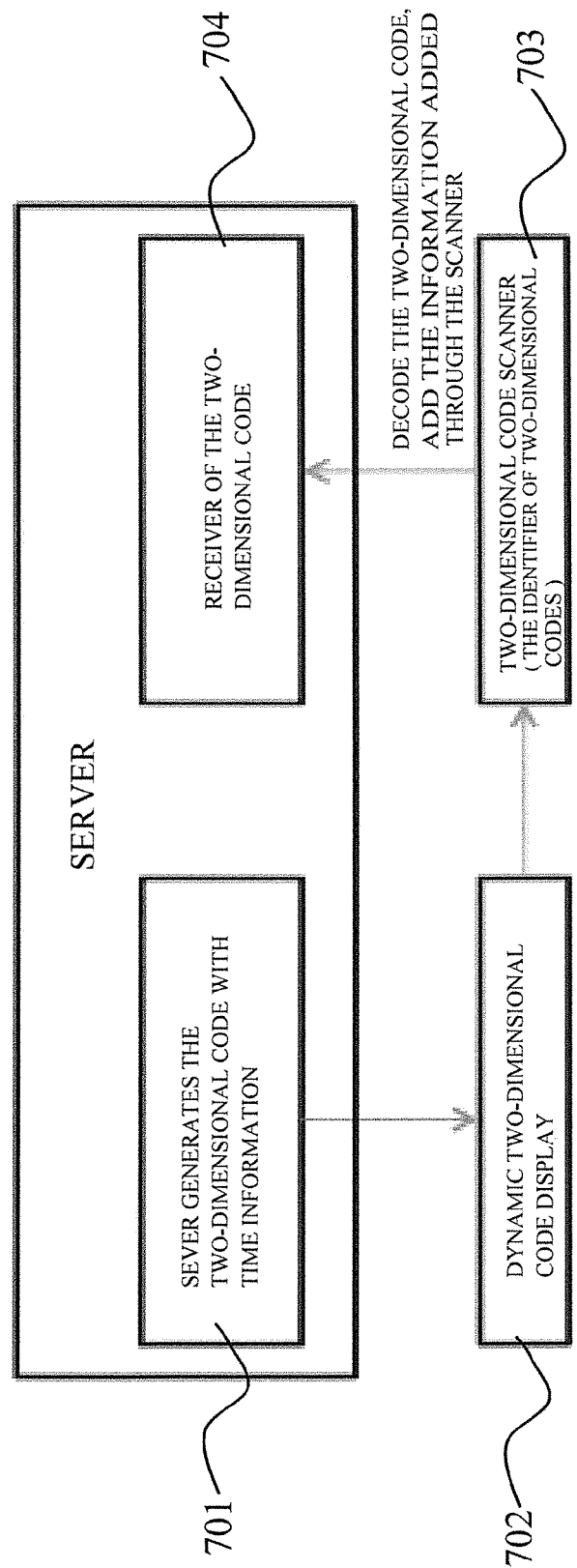
FIG. 7 is a block diagram illustrating a sever interacting with a display device according to the preferred embodiment of the present invention.

FIG. 7 illustrates the process of generating and using the three-dimensional code according to the present invention.

In this embodiment, a display screen is connected with a server. After the information structure and content of the three-dimensional code is determined, the server 701 will generate the two-dimensional codes with the time information. In detail, the process of generating the above two-dimensional codes includes:

a) Generating the time information every time interval T;
b) Continuously encrypting and encoding the time information together with other non-time information;
c) Forming a continuous sequence of two-dimensional codes;

After the sequence of the two-dimensional codes is generated, it is sent to the display screen terminal 702 for display. When the user sees the flickering two-dimensional code, he/she can capture it by the two-dimensional code recognition device 703. After captured, the two-dimensional code is analyzed, and the analyzed information along with any other relevant information the user adds through the two-dimensional code recognition device is sent to the receiver.

The usage process of the three-dimensional code, comprises the following steps:

The information content of the three-dimensional code is encrypted after determined. A two-dimensional code with the time information is generated every time interval T by calling the two-dimensional code generation module, and by coding through the coding principle of the three-dimensional code of the present invention, the three-dimensional code is generated;

The generated three-dimensional code is implanted into the display device, and the three-dimensional is displayed together with other contents displayed on the display device. The displayed three-dimensional code is a two-dimensional code image that dynamically changes with time.

A two-dimensional code recognition device captures the two-dimensional code that dynamically changes with time on a display device. Then, the two-dimensional code recognition device or the background server will analyze the captured two-dimensional code. The above analyzing process includes:

After the two-dimensional code is captured, the information contained in the two-dimensional code is decoded through a two-dimensional code reading application, after which the encrypted decoded information of two-dimensional code will be decrypted, and all the time information and non-time information contained in the two-dimensional code will be analyzed.

The process of decoding and/or decrypting the two-dimensional code is completed in the two-dimensional code recognition device or the server.

The process of further analyzing the time and non-time information contained in the decrypted information is completed in the two-dimensional code recognition device or the server.

The interaction process between the two-dimensional code recognition device and the display terminal is completed.

The two-dimensional code recognition device refers to a smart device capable of capturing/identifying two dimensional codes, including, but not limited to, iPhones, Android based mobile phones, Symbian based mobile phones, Tablet PCs, or handheld PDAs.

If the encryption process is completed in the client computer connected to the display device, then the encryption program of the client computer connected to the display device is called for implementation.

If the encryption process is completed in the server, then the confirmed information content of the three-dimensional code will first be sent to the server, and then be sent back to the client computer connected to the display device after the encryption process is completed in the server.

The process of calling the two-dimensional code generation module is completed in the client computer connected to the display device or the server.

The present invention provides a method for interaction of three-dimensional code, comprising the steps of:

(A) generating a continuous code flow of a three-dimensional code having a time information in a server, wherein the time information refers to a time record generated every time unit;

(B) displaying said continuous code flow of said three-dimensional code dynamically on a display terminal; and (C) acquiring the three-dimensional code through an identifier of a two-dimensional codes.

The step (A) further comprises the steps of:

(A.1) generating the continuous three-dimensional code;
(A.2) encrypting the continuous three-dimensional code;
(A.3) coding the encrypted three-dimensional code every time interval; and
(A.4) generating the code flow of said three-dimensional code having time continuity.
(A.5) sending the code flow of the three-dimensional code to the display terminal for implanting the three-dimensional code to the display content, so that the three-dimensional code and the display content are displayed on the display terminal together.

Wherein the step (A.1) further comprises the steps of:

(A.1.1) generating an initial string through structurally describing a concentrated non-time information;

(A.1.2) generating a time information through a clock tick through a tick generator, wherein the time information refers to a constant time;

(A.1.3) adding the time information to said initial string for generating a dynamic string every time interval, wherein the time interval is an unit;

(A.1.4) generating the two-dimensional code with the time information through coding the dynamic string by calling a generator of the two-dimensional code; and (A.1.5) generating the continuous three-dimensional code through integrating the two-dimensional code with the time information in accordance with generation time of the two-dimensional code with the time information in chronological order.

Wherein the step (C) further comprises the steps of:

(C.1) acquiring a fragment of the three-dimensional code through capturing the three-dimensional code through the identifier of two-dimensional codes; and (C.2) identifying and decrypting the fragment of the three-dimensional code to restore the fragment of the three-dimensional code to generate the fragment of the three-dimensional code carrying the time information.

(C.3) sending the information to the server for operating or controlling the display content on said display terminal.

Between the step (A.1) and the step (A.2), further comprises a step of determining an information content of said three-dimensional code, wherein the information content of the three-dimensional code comprises information selected from a group consisting of a time information, a location information, a device information, a content information, a command information, and a time information.

The encryption algorithm of the encrypting of the continuous three-dimensional code is completed through an encryption algorithm selected from a group consisting of a technique consisting essentially of a symmetric encryption technique and an asymmetric encryption technique.

The present invention provides a method of generating a continuous three-dimensional code flow, comprising the steps of:

(a) providing a display content;

(b) generating a continuous three-dimensional code having a default content information and a time information; and (c) integrating continuously the continuous three-dimensional code having the default content information and the time information into the display content for displaying continuously the display content and the continuous three-dimensional code having the default content information and the time information together.

The step (b) further comprises the steps of:

(b.1) generating the time information through a clock tick through a tick generator;

(b.2) generating a two-dimensional code having the default content information through calling a generator of the two-dimensional code;

(b.3) generating the continuous three-dimensional code having the time information and said default content information through adding said time information to said two-dimensional code having said default content information;

(b.4) coding the three-dimensional code having the time information and the default content information; and (b.5) generating the continuous three-dimensional code having the default content information and the time information in accordance with generation time of the two-dimensional code with the time information in chronological order.

Wherein the generator of the two-dimensional code is a generation device or a generation software.

The step (b.2) further comprises the steps of:

(b.2.1) providing the default content information;

(b.2.2) generating an initial string through structurally describing a concentrated non-time information;

(b.2.3) adding the default content information to the initial string for generating a dynamic string every time interval, wherein the time interval is an unit; and (b.2.4) generating the two-dimensional code with the time information and the default content information through coding the dynamic string having the default content.

The step (b.2.2) further comprises the steps of:

(b.2.2.1) acquiring a information content through describing the concentrated non-time information;

(b.2.2.2) confirming the information content; and (b.2.2.3) generating the initial string in accordance with the information content.

The information content comprises information selected form a group consist of a location information, a device information, a command information.

Between the step (b.3) and step (b.4) further comprises the step of encrypting the three-dimensional code having the time information and the default content information.

The present invention provides another method of generating a continuous three-dimensional code flow, comprising the steps of:

(1) providing a display content having a plurality of scenes;

(2) generating a continuous three-dimensional code having a time information; and (3) integrating continuously the continuous three-dimensional code having the time information into the display content for displaying continuously the display content and the continuous three-dimensional code having said time information together.

The step (2) further comprises the steps of:

(2.1) generating the time information through a clock tick through a tick generator;

(2.2) generating a two-dimensional code through calling a generator of the two-dimensional code;

(2.3) generating the three-dimensional code having the time information through adding the time information to the two-dimensional code;

(2.4) coding the three-dimensional code having the time information; and (2.5) generating the continuous three-dimensional code having the time information in accordance with generation time of the two-dimensional code with the time information in chronological order.

Preferably, the generator of the two-dimensional code is a generation device or a generation software.

The step (2.2) further comprises the steps of:

(2.2.1) generating an initial string through structurally describing the display content, wherein the initial string containing a plurality of content information acquired from the display content, each the content information corresponding to each the scene of the display content;

(2.2.2) generating a dynamic string every time interval in accordance with the initial string, wherein said time interval is an unit; and (2.2.3) generating the two-dimensional code through coding the dynamic string having a plurality of the content information.

The step (b.2.2) further comprises the steps of:

(2.2.2.1) acquiring a information content through describing the display content having a plurality of scenes;

(2.2.2.2) confirming the information content; and (2.2.2.3) generating the initial string in accordance with the information content.

Between the step (2.3) and step (2.4) further comprises the step of encrypting the three-dimensional code having the time information and the default content information.

The present invention provides another method of generating a continuous three-dimensional code flow, comprising the steps of:

(I) providing a display content having at least two scenes;

(II) generating a continuous three-dimensional code having a time information, wherein the continuous three-dimensional code having the time information corresponds to one of the scenes of the display content;

(III) generating a continuous three-dimensional code having a time information and a default content information, wherein the continuous three-dimensional code having a time information and a default content information corresponds to the other the scene of the display; and (IV) integrating continuously the continuous three-dimensional code having the time information into the scene of the display content and integrating the continuous three-dimensional code having the time information and the default content information into the other the scene of the display content in accordance with the scenes in chronological order.

The step (II) further comprises the steps of:

(II.1) generating the time information through a clock tick through a tick generator;

(II.2) generating a two-dimensional code through calling a generator of the two-dimensional code;

(II.3) generating the three-dimensional code having the time information through adding the time information to the two-dimensional code;

(II.4) coding the three-dimensional code having the time information; and (II.5) generating the continuous three-dimensional code having the time information in accordance with generation time of the two-dimensional code with the time information in chronological order.

Preferably, the generator of the two-dimensional code is a generation device or a generation software.

The step (II.2) further comprises the steps of:

(II.2.1) generating an initial string through structurally describing one of the scenes of the display content, wherein the initial string containing a content information acquired from the scene of the display content, the content information corresponding to the scene of the display content;

(II.2.2) generating a dynamic string every time interval in accordance with the initial string, wherein the time interval is an unit; and (II.2.3) generating the two-dimensional code through coding the dynamic string having the content information.

The step (II.2.2) further comprises the steps of:

(II.2.2.1) acquiring an information content through describing the scene of the display content;

(II.2.2.2) confirming the information content; and (II.2.2.3) generating the initial string in accordance with the information content.

Preferably, the information content comprises information selected form a group consist of a location information, a device information, a command information, a content information.

Between the step (II.3) and step (II.4) further comprises the step of encrypting the three-dimensional code having the time information and the default content information.

The step (III) further comprises the steps of:

(III.1) generating the time information through a clock tick through a tick generator;

(III.2) generating a two-dimensional code having the default content information through calling a generator of the two-dimensional code;

(III.3) generating the continuous three-dimensional code having the time information and the default content information through adding the time information to the two-dimensional code having the default content information;

(III.4) coding the three-dimensional code having the time information and the default content information; and (III.5) generating the continuous three-dimensional code having the default content information and the time information in accordance with generation time of the two-dimensional code with the time information in chronological order.

Preferably, the generator of the two-dimensional code is a generation device or a generation software.

The step (III.2) further comprises the steps of:

(III.2.1) providing said default content information;

(III.2.2) generating an initial string through structurally describing a concentrated non-time information;

(III.2.3) adding the default content information to the initial string for generating a dynamic string every time interval, wherein the time interval is an unit; and (III.2.4) generating the two-dimensional code with the time information and the default content information through coding the dynamic string having the default content.

The step (III.2.2) further comprises the steps of:

(III.2.2.1) acquiring a information content through describing the concentrated non-time information;

(III.2.2.2) confirming the information content; and (III.2.2.3) generating the initial string in accordance with the information content.

Between the step (III.3) and step (III.4) further comprises the step of encrypting the three-dimensional code having the time information and the default content information.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for coding and decoding three-dimensional code of a content to be displayed on a screen, comprising the steps executed by a computer of:

(a.1) acquiring an initial string A1 every time unit, wherein said time unit is a constant or variable time interval T;

(a.2) adding a time information in said string A1 acquire acquiring a string B1;

(a.3) generating a two-dimensional code of said content;

(a.4) recalling step (a.1), step (a.2), and step (a.3) generating the next said two-dimensional code in the next time unit, wherein said time unit is a constant or variable time interval T;

(a.5) generating said two-dimensional code continuously forming a continuous code flow of a three-dimensional code of said content; and (b.1) capturing said continuous code flow of said three-dimensional code through an identifier of two-dimensional codes acquiring a fragment of said three-dimensional code, wherein said fragment of said three-dimensional code comprises at least one frame of said two-dimensional code that displays on the screen of said identifier.

2. The method, as recited in claim 1, wherein said two-dimensional code is generated by a two-dimensional code generation module which is selected from a group consisting essentially of a generation device of said two-dimensional code and a generation software of said two-dimensional code.

3. The method, as recited in claim 1, wherein a format of said two-dimensional code is selected from a group consisting essentially of Aztec, Maxi, Code, QR Code, and Data Matrix.

4. The method, as recited in claim 1, wherein said time unit refers to a time interval T, wherein T represents a constant time length or a function T(t) depending on time.

5. The method, as recited in claim 1, wherein said initial string A1 is selected from a group consisting essentially of a constant string and a variable string.

6. The method, as recited in claim 1, wherein after said time information is added to said initial string A1 to form said string B1, said string B1 is encrypted to form a string S1, and then said two-dimensional code is coded with said string S1.

7. The method, as recited in claim 1, wherein said continuous code flow of said three-dimensional code is displayed by utilizing a method of compression coding for image or video, including entropy coding, predictive coding, transform coding, hybrid coding, or said continuous code flow of the three-dimensional code is directly encapsulated into a format of AVI (Audio Video Interleaved), RMVB (RealMedia Variable Bitrate), MKV (Matroska Multimedia Container), ASF Advanced Steaming Format), WMV (Windows Media Video), MP4 (MPEG-4 Part 14), 3GP (Third Generation Partnership Project file format), and FLV (Flash Live Video).

8. The method, as recited in claim 1, wherein said three-dimensional code is coded with time information and non-time information.

9. The method, as recited in claim 8, wherein said non-time information is selected from a group consisting essentially of location information, device information, content information, user information, and command information.

10. The method, as recited in claim 1, wherein the steps (a1)-(a5) uses an encryption algorithm utilizing a technique selected essentially from a symmetric encryption technique and an asymmetric encryption technique.

11. The method, as recited in claim 1, wherein a basic unit of said three-dimensional code is said two-dimensional code coded with time information.

12. A method for coding and decoding three-dimensional code of a content to be displayed on a screen, comprising the steps executed by a computer of:
(a) continuously generating a plurality of two-dimension codes of said content in a time series forming a continuous code flow of a three-dimensional code of said content by the steps of:
(a.1) acquiring an initial string A1 every time unit;
(a.2) adding a time information in said string A1 acquiring a string B1;
(a.3) generating one said two-dimensional code in said time unit of said content; and
(a.4) repeating the step (a.1), step (a.2), and step (a.3) to generate the next said two-dimensional code in the next time unit of said content; and
(b) capturing said continuous code flow of said three-dimensional code through an identifier of two-dimensional codes acquiring a fragment of said three-dimensional code, wherein said fragment of said three-dimensional code comprises at least one frame of said two-dimensional code that displays on said screen of said identifier.

* * * * *